(12) United States Patent
Kang et al.

(10) Patent No.: US 7,956,119 B2
(45) Date of Patent: Jun. 7, 2011

(54) COATING COMPOSITION FOR A SOFT FEEL COATING ON PORTABLE TERMINALS AND ELECTRONIC INSTRUMENTS

(75) Inventors: Do-Heang Kang, Seoul (KR); Young-Ki Kim, Yongin-si (KR); Hoon-Soo Park, Gwangmyeong-si (KR)

(73) Assignee: Samsung Electronics Co., Ltd (KR)

( * ) Notice: Subject to any disclaimer, the term of this patent is extended or adjusted under 35 U.S.C. 154(b) by 1116 days.

(21) Appl. No.: 11/643,375

(22) Filed: Dec. 21, 2006

(65) Prior Publication Data

US 2007/0137524 A1 Jun. 21, 2007

(30) Foreign Application Priority Data

Dec. 21, 2005 (KR) .................. 10-2005-0127241

(51) Int. Cl.
 *C08K 3/34* (2006.01)
(52) U.S. Cl. ........ 524/493; 524/360; 524/492; 524/507; 524/549; 524/558
(58) Field of Classification Search .................. 524/493, 524/507, 558, 360, 492, 549
See application file for complete search history.

(56) References Cited

U.S. PATENT DOCUMENTS

| | | | |
|---|---|---|---|
| 3,943,086 A | 3/1976 | Schein et al. | |
| 5,728,767 A * | 3/1998 | Kanetou et al. | 524/504 |
| 7,408,000 B2 * | 8/2008 | Nakayama et al. | 524/445 |
| 2005/0013979 A1 * | 1/2005 | Yoshizaki et al. | 428/215 |
| 2005/0203242 A1 * | 9/2005 | Nakayama et al. | 524/570 |

FOREIGN PATENT DOCUMENTS

| | | |
|---|---|---|
| JP | 63159427 | 7/1988 |
| JP | 01-221463 | 9/1989 |
| JP | 07-247382 | 9/1995 |
| WO | WO 2005/037876 | 4/2005 |

* cited by examiner

*Primary Examiner* — David Wu
*Assistant Examiner* — Marie Reddick
(74) *Attorney, Agent, or Firm* — The Farrell Law Firm, P.C.

(57) ABSTRACT

A coating composition for a soft feel coating on portable terminals and electronic instruments having excellent discoloration resistance, heat resistance, yellowing resistance and anti-fouling properties is disclosed. The coating composition includes an oligomer composition obtained by blending polybutadiene polyol and polyolefinic acid, and various additives added to the oligomer composition. The coating composition is coated onto surfaces of portable terminals and electronic instruments.

5 Claims, 3 Drawing Sheets

(COATING FILM ACCORDING TO PRIOR ART)   (COATING FILM ACCORDING TO PRESENT INVENTION)

(COATING FILM ACCORDING TO PRIOR ART)

(COATING FILM ACCORDING TO PRESENT INVENTION)

COATING COMPOSITION FOR A SOFT FEEL COATING ON PORTABLE TERMINALS AND ELECTRONIC INSTRUMENTS

PRIORITY

This application claims priority to an application entitled "COATING COMPOSITION FOR SOFT FEEL COATING ON SURFACE OF PORTABLE TERMINALS AND ELECTRONIC INSTRUMENTS" filed in the Korean Industrial Property Office on Dec. 21, 2005 and assigned Serial No. 2005-127241, the contents of which are incorporated herein by reference.

BACKGROUND OF THE INVENTION

1. Field of the Invention

The present invention relates to a coating composition for a soft feel coating on portable terminals and electronic instruments, and to a method for preparing the same coating composition.

2. Description of the Related Art

In general, a resin composition for a soft feel coating has been used for cosmetic containers, golf balls and portable terminals. Most of such resin compositions for a soft feel coating are based on polyester polyol or polycaprolactone polyol.

Generally, the coating composition used in the aforementioned articles consists of a primer composition and a topcoat composition because a polyol-based coating composition of the topcoat shows poor adhesion to the articles.

To improve the adhesion to the articles, an acrylic color coating composition is preliminarily applied as a primer coating layer, and then a polyol-based urethane coating composition is applied thereon.

Because the articles are usually exposed to the exterior environment due to the unique applications thereof, coating materials are required to show excellent ultraviolet (UV) resistance upon exposure to the exterior over long periods of time, while providing sufficient basic physical properties, including adhesion, high gloss and durability. Hence, a coating composition used as the topcoat for such articles has to show little discoloration upon exposure to UV rays over long periods of time. Conventional polyol-based urethane coating compositions have satisfied physical properties including adhesion, high gloss and durability to a certain degree. However, such conventional compositions undergo severe yellowing due to the exposure to UV rays over long periods of time, and thus have a problem related to the appearance of the articles.

Additionally, the polyol-based coating compositions tend to undergo yellowing and discoloration due to their structural characteristics. Thus, when such compositions are applied to articles, the resultant coating film may be discolored. Therefore, such compositions cannot provide a desired color.

Under these circumstances, the polyol-based coating compositions are extremely limited in their applications for surfaces of portable terminals. In other words, such coating compositions can be applied to black-colored articles that hide discoloration, but it is difficult to satisfy current demands for various colors and designs.

Further, surfaces of portable terminals coated with the conventional coating compositions show poor resistance to surface contamination. For example, when the surfaces are contaminated with pens, the contaminated portions cannot be cleaned with ease, even if the portions are treated with methyl alcohol.

SUMMARY OF THE INVENTION

Accordingly, the present invention has been made to solve the above-mentioned problems occurring in the prior art. An object of the present invention is to provide a coating composition for a soft feel coating on portable terminals and electronic instruments, which provides excellent heat resistance, yellowing resistance and color stability with time to surfaces of the portable terminals and electronic instruments, and a method for preparing the same coating composition.

Another object of the present invention is to provide a coating composition for a soft feel coating on portable terminals and electronic instruments, which provides various light colors, including white, other than black to surfaces of the portable terminals and electronic instruments, and a method for preparing the same coating composition.

Still another object of the present invention is to provide a coating composition for a soft feel coating on portable terminals and electronic instruments, which forms a coating layer having excellent anti-fouling property to reduce surface contamination of the portable terminals and electronic instruments, and a method for preparing the same coating composition.

To accomplish the aforementioned objects, according to an aspect of the present invention, there is provided a coating composition for a soft feel coating on portable terminals and electronic instruments, which shows excellent discoloration resistance, heat resistance, yellowing resistance and anti-fouling properties. The coating composition includes an oligomer composition obtained by blending polybutadiene polyol and polyolefinic acid, and various additives added to the oligomer composition. The coating composition is coated onto surfaces of portable terminals and electronic instruments.

According to another aspect of the present invention, there is provided a method for preparing a coating composition for a soft feel coating on portable terminals and electronic instruments, which shows excellent discoloration resistance, heat resistance, yellowing resistance and anti-fouling property. The method includes providing 30-50 wt % of an oligomer composition by blending polybutadiene polyol and polyolefinic acid, adding 2-10 wt % of an urethane resin-based mattifying agent, 2-10 wt % of a silica-based mattifying agent, 2-10 wt % of a liquid silicone additive, 0.1-1 wt % of dibutyltin dilaurate, 10-30 wt % of toluene, 20-50 wt % of cyclohexanone, and 0.1-1 wt % of a defoaming agent to the oligomer composition, and adding a curing agent to the resultant composition.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
FIG. 1 shows the results of a test for physical properties of the coating composition for a soft feel coating on portable terminals and electronic instruments according to the present invention, as compared to the physical properties of a conventional coating composition, after the compositions are coated onto the surface of a portable terminal.
Figure 1:

Hereinafter, preferred embodiments of the present invention will be described with reference to the accompanying drawings.

The oligomer composition, which may be used in the coating composition for a soft feel coating on portable terminals and electronic instruments according to the present invention, is obtained by blending polybutadiene polyol and polyolefinic acid.

Various additives are added to the oligomer composition to provide the coating composition having excellent discoloration resistance, heat resistance, yellowing resistance and antifouling property.

The resultant coating composition is coated onto the surfaces of portable terminals and electronic instruments.

More particularly, preparation of the oligomer composition represented by Formula 3 is produced by blending polybutadiene polyol represented by Formula 1 with polyolefinic acid represented by Formula 2;

Formula 1

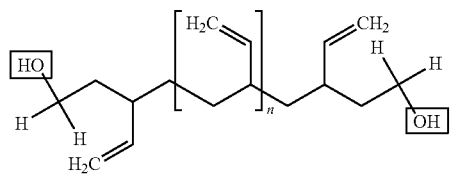

wherein n is an integer of 18-60;

Formula 2

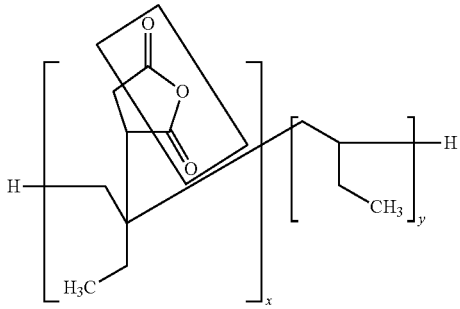

wherein x=1 and y=20. The oligomer composition, polybutadiene polyol and polyolefinic acid are a COH-containing polymer.

Although Formula 2 shows an embodiment of olefinic acid, wherein x is an integer equal to 1 and y is an integer equal to 20, each of x and y is a variable number equal to 1 or more.

The boxed part in Formula 1 representing polybutadiene polyol reacts with the boxed part in Formula 2 representing polyolefinic acid via chain polymerization based on polyester reaction, thereby forming the oligomer composition represented by the following Formula 3:

Formula 3

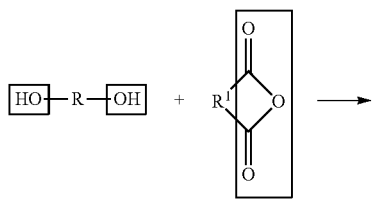

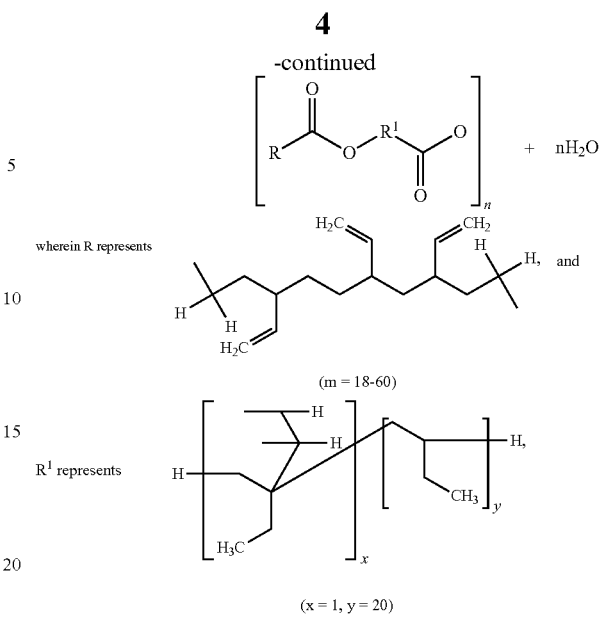

wherein each of m, x, y and n represents an integer, which is variable as necessary.

Reference will now be made in detail to a preferred embodiment of the method for preparing the oligomer composition according to the present invention.

EXAMPLE 1

The mixture of 698-702 parts by weight of polybutadiene polyol(molecular weight: 1000), 198-202 parts by weight of polyolefinic acid (molecular weight: 500-1000), and 0.19-0.21 parts by weight of dibutyltin acetate were added to a 1 L four-necked reaction flask. The mixture was heated with stirring, and allowed to react at a temperature of 180±5° C. for 14 hours to obtain of 798-802 parts by weight of a polymerized product. Herein, all water was removed via dehydration of polyester. The oligomer composition for a coating composition for a soft feel coating had a viscosity of about 5500 cps at 25° C.

Another preferred embodiment of the method for preparing the oligomer composition according to the present invention will be explained hereinafter.

EXAMPLE 2

The mixture of 807.6-900 parts by weight of polybutadiene polyol (molecular weight: 3000), 119.7-125 parts by weight of 1-isocyanato-3-isocyanatomethyl-3,5,5-trimethylcyclohexane, 62.5-70 parts by weight of 2-hydroxyethyl acrylate, 1-5 wt % of hydroquinone, and 0.2-0.5 parts by weight of dibutyltin dilaurate were added to a 1 L four-necked reaction flask. The mixture was heated with stirring, and allowed to react at a temperature of 80±5° C. for 14 hours to obtain 920-1000 parts by weight of a polymerized product. The polymerized product had a viscosity of about 5500 cps at 25° C.

Hereinafter, the method for preparing the coating composition for a soft feel coating on portable terminals and electronic instruments according to a preferred embodiment of the present invention.

Figure 3:
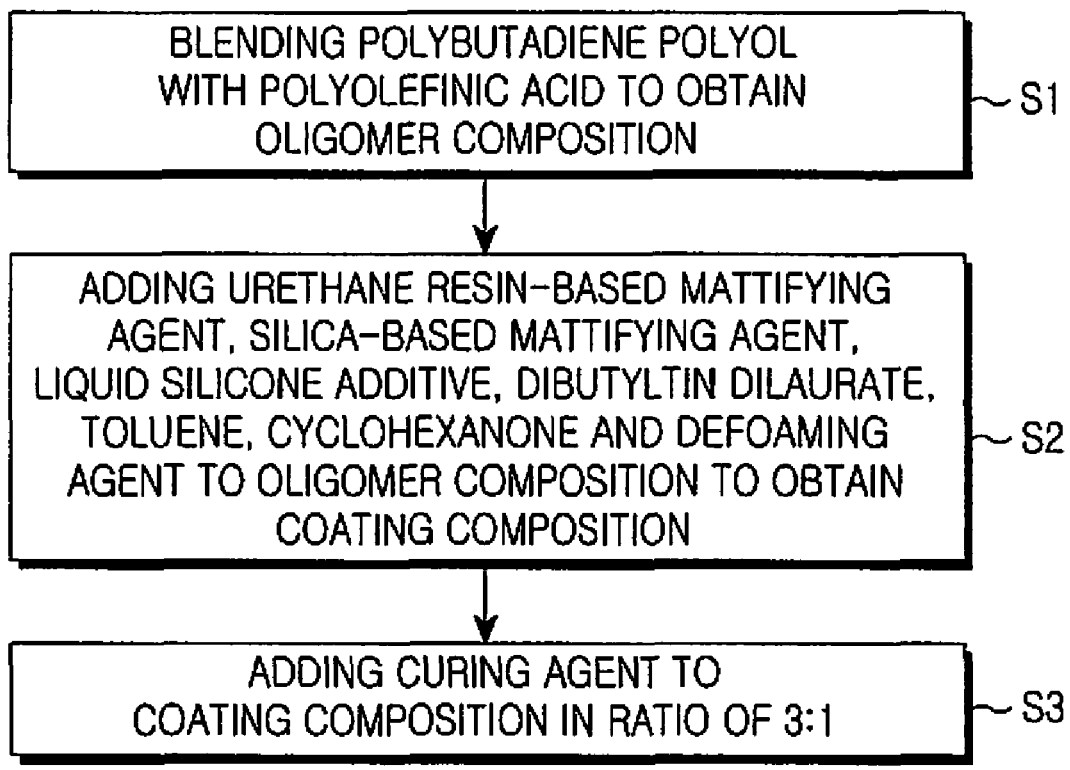
FIG. 3 is a flow chart illustrating a method for preparing the coating composition for a soft feel coating on portable terminals and electronic instruments according to the present invention.

As shown in FIG. 3, polybutadiene polyol is blended with polyolefinic acid to provide an oligomer composition (30-50 wt %) (S1).

To 30-50 wt % of the oligomer composition obtained from step S1, 2-10 wt % of an urethane resin-based mattifying agent, 2-10 wt % of a silica-based mattifying agent, 2-10 wt % of a liquid silicone additive, 0.1-1 wt % of dibutyltin dilaurate, 10-30 wt % of toluene, 20-50 wt % of cyclohexanone, and 0.1-1 wt % of a defoaming agent are added to provide a composition (S2).

Then, a curing agent is added to the composition obtained from step S2 in a ratio of 3:1 (S3).

The resultant coating composition is coated onto a portable terminal to form a coating film. Then, the coating composition was compared with a conventional coating composition in terms of physical properties. The results are shown in FIG. 1.

As shown in FIG. 1, the so-called "primer" for a terminal casing refers to a layer having a desired color of the terminal. The coating composition according to the present invention is coated onto the primer layer.

Each of the coating composition according to the present invention and a conventional coating composition was coated under the same primer conditions, and each coating film was dried at 85° C. for 3 hours.

As shown in FIG. 1, the coating film formed by the conventional coating composition showed severe discoloration so that the originally intended color of the primer layer cannot be maintained. On the contrary, the coating film formed by the coating composition according to the present invention showed the color of the primer layer as intended.

Additionally, as can be seen from FIG. 1, the coating film formed by the conventional coating composition showed severe discoloration in a test for determining effects of moisture upon discoloration, while the coating film formed by the coating composition according to the present invention showed little discoloration.

Figure 2:
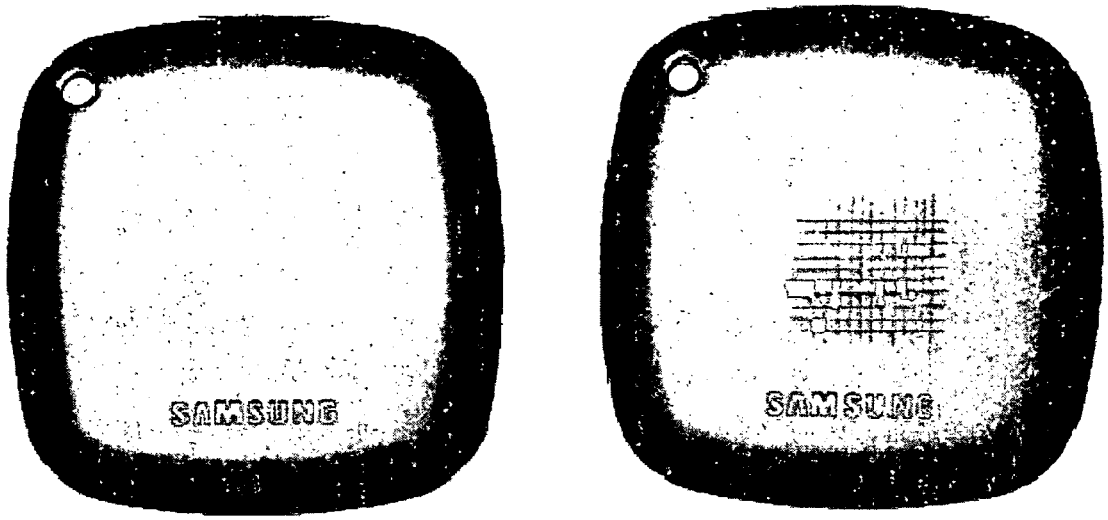
FIG. 2 shows the results of a test for anti-fouling properties of the coating composition for a soft feel coating on portable terminals and electronic instruments according to the present invention, as compared to the anti-fouling properties of a conventional coating composition, after the compositions are coated onto the surface of a portable terminal.
Figure 2:
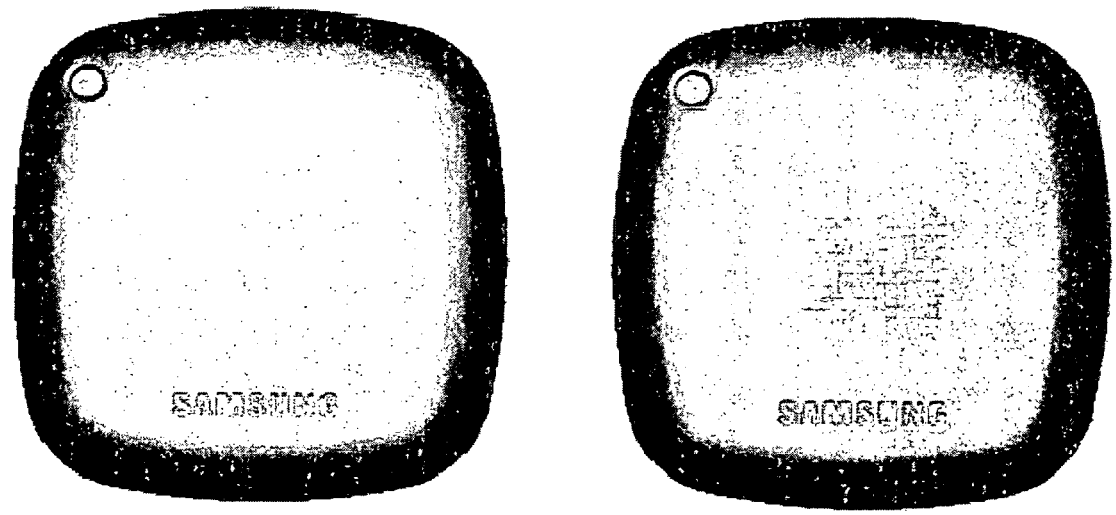

Further, FIG. 2 illustrates the results of a test for anti-fouling properties. The coating composition according to the present invention showed excellent anti-fouling properties compared to the conventional coating composition, as determined by the naked eye.

Although objective data for the effect of the coating composition according to the present invention is required, there are no references to define yellowing resistance and anti-fouling properties and different standards and references are adopted by those skilled in the art. Hence, the above-described test results are difficult to be represented by numeral data, and only the results obtained from the examination by the naked eye can be available.

According to the present invention, various light colors having high-quality soft feel can be coated on the surface of a terminal.

More particularly, when the coating composition according to the present invention having excellent heat resistance, yellowing resistance and anti-fouling properties, is coated onto the surfaces of portable terminals and electronic instruments, it is possible to prevent discoloration, and to realize various light colors including white, rather than only black.

While the coating composition for a soft feel coating on portable terminals and electronic instruments according to the present invention and the method for preparing the same have been shown and described with reference to certain preferred embodiments thereof, it will be understood by those skilled in the art that various changes in form and details may be made therein without departing from the spirit and scope of the invention as defined by the appended claims.

What is claimed is:

1. A coating composition for a soft feel coating on portable terminals and electronic instruments, the coating composition comprising:

an oligomer according to Formula 3:

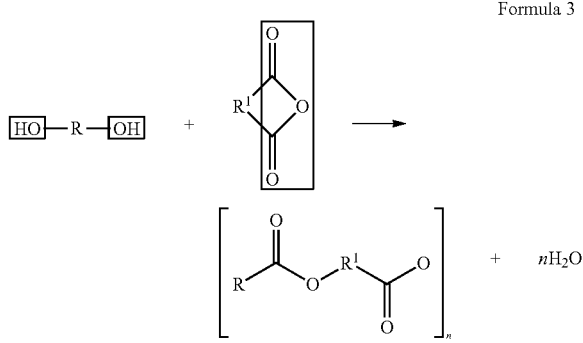

Formula 3 wherein n is an integer equal to 1 or more;

R represents 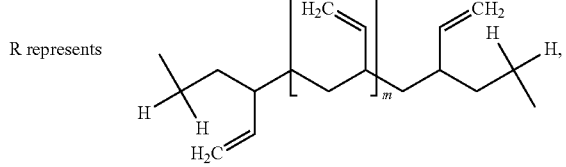

wherein m is an integer ranging from 18 to 60; and $R^1$ represents 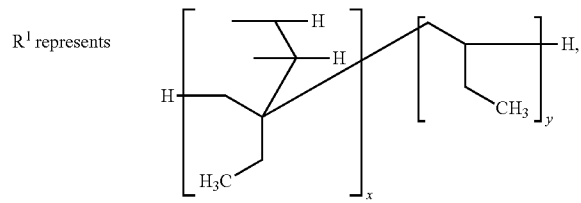

wherein each of x and y is an integer greater than or equal to 1; and additives for providing excellent discoloration resistance, heat resistance, yellowing resistance and anti-fouling properties, wherein the additives include a urethane resin-based mattifying agent, a silica-based mattifying agent, a liquid silicone additive, dibutyltin dilaurate, toluene, cyclohexanone, a defoaming agent, and a curing agent.

2. The composition according to claim 1, wherein the oligomer represented by Formula 3 is produced by blending a polybutadiene polyol represented by Formula 1 with a polyolefin acid represented by Formula 2;

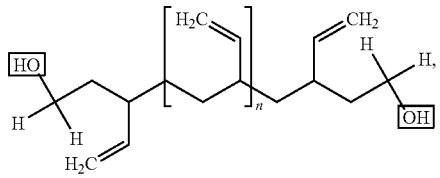

Formula 1 wherein n is an integer ranging from 18 to 60;

Formula 2

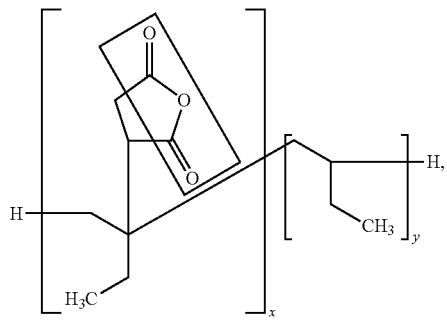

wherein each of x and y is an integer greater than or equal to 1; and the boxed part in Formula 1 reacts with the boxed part in Formula 2 via chain polymerization based on polyester reaction, thereby forming the oligomer.

3. The coating composition according to claim 1, wherein the curing agent is added to the coating composition in a mixing ratio of 3:1, respectively.

4. The composition according to claim 1, further comprising dibutyltin acetate.

5. The coating composition according to claim 1, further comprising 1-isocyanato-3-isocyanatomethyl-3,5,5-trimethylcyclohexane, 2-hydroxyethyl acrylate, and hydroquinone.

* * * * *